United States Patent
Wu et al.

(10) Patent No.: US 7,387,661 B2
(45) Date of Patent: Jun. 17, 2008

(54) PLEATED CONSTRUCTION FOR EFFECTING GAS TRANSFER MEMBRANE

(75) Inventors: Qunwei Wu, Westford, MA (US); Craig L. Brodeur, Marlborough, MA (US); Jieh-Hwa Shyu, Andover, MA (US); Eric McNamara, Nashua, NH (US)

(73) Assignee: Entegris, Inc., Chaska, MN (US)

( * ) Notice: Subject to any disclaimer, the term of this patent is extended or adjusted under 35 U.S.C. 154(b) by 270 days.

(21) Appl. No.: 10/554,897

(22) PCT Filed: Apr. 22, 2004

(86) PCT No.: PCT/US2004/012247

§ 371 (c)(1),
(2), (4) Date: Oct. 28, 2005

(87) PCT Pub. No.: WO2004/094022

PCT Pub. Date: Nov. 4, 2004

(65) Prior Publication Data

US 2007/0017366 A1    Jan. 25, 2007

Related U.S. Application Data

(60) Provisional application No. 60/464,523, filed on Apr. 22, 2003.

(51) Int. Cl.
*B03C 3/74* (2006.01)

(52) U.S. Cl. .................................. 95/45; 96/4

(58) Field of Classification Search .................. 95/45, 95/43, 46, 149, 156, 158, 241; 96/4, 6; 210/321.6–321.9, 210/493.1–493.5

See application file for complete search history.

(56) References Cited

U.S. PATENT DOCUMENTS

| 3,637,078 | A |   | 1/1972  | Hollar ........................... 210/73 |
|-----------|---|---|---------|-------------------------------------------|
| 3,668,837 | A |   | 6/1972  | Gross ........................... 55/158   |
| 3,738,813 | A |   | 6/1973  | Esmond ....................... 23/258.5    |
| 3,739,553 | A |   | 6/1973  | Aine ............................ 55/158   |
| 3,799,354 | A | * | 3/1974  | Buckman et al. .......... 210/493.1        |
| 3,800,510 | A |   | 4/1974  | Lamond ....................... 55/158      |
| 4,154,688 | A | * | 5/1979  | Pall ............................ 210/487  |
| 4,268,279 | A |   | 5/1981  | Shindo et al. .................. 55/16     |
| 4,955,992 | A | * | 9/1990  | Goodale et al. ................ 96/197     |
| 5,073,268 | A |   | 12/1991 | Saito et al. .................. 210/638    |
| 5,149,340 | A |   | 9/1992  | Waycuilis ...................... 55/16     |
| 5,154,827 | A |   | 10/1992 | Ashelin et al. ............... 210/490     |
| 5,162,102 | A |   | 11/1992 | Nogawa et al. ............... 422/48       |

(Continued)

FOREIGN PATENT DOCUMENTS

WO    WO 98/00225 A    1/1998

(Continued)

*Primary Examiner*—Duane Smith
*Assistant Examiner*—Sonji Turner
(74) *Attorney, Agent, or Firm*—John E. Pillion; Timothy J. King

(57) ABSTRACT

A contactor for effecting passage through a membrane from a first fluid a second fluid is provided. A cylindrical pleated membrane cartridge is positioned within a housing having a first inlet and a first outlet from a first fluid and at lest a second outlet for a second fluid. At least one baffle is positioned within a first flow path for the first fluid.

16 Claims, 5 Drawing Sheets

U.S. PATENT DOCUMENTS

| | | | |
|---|---|---|---|
| 5,522,917 A | 6/1996 | Honda et al. | 95/46 |
| 5,989,318 A * | 11/1999 | Schroll | 96/6 |
| 6,103,120 A * | 8/2000 | Hopkins et al. | 210/497.1 |
| 6,110,368 A * | 8/2000 | Hopkins et al. | 210/497.1 |
| 6,171,367 B1 * | 1/2001 | Peng et al. | 95/46 |
| 6,533,933 B1 * | 3/2003 | Stankowski et al. | 210/232 |
| 7,014,679 B2 * | 3/2006 | Parekh et al. | 95/46 |
| 2001/0009126 A1 | 6/2001 | Nagai | 96/6 |
| 2003/0116015 A1 | 6/2003 | Sengupta et al. | 95/46 |

FOREIGN PATENT DOCUMENTS

| | | |
|---|---|---|
| WO | WO 00/13767 A | 3/2000 |
| WO | WO 02/36252 A1 | 5/2002 |

* cited by examiner

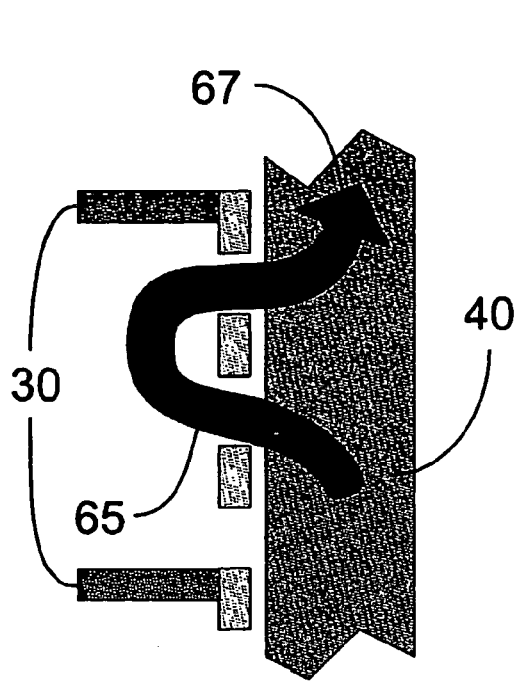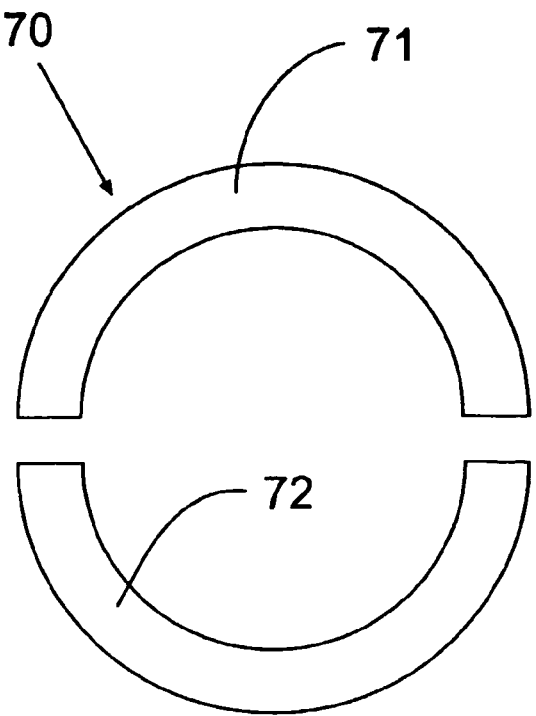
Figure 4  Figure 5
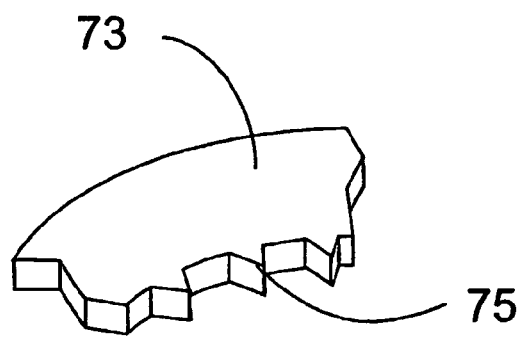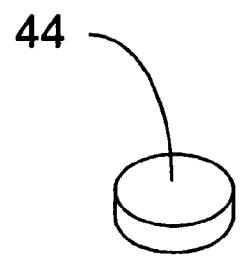
Figure 6  Figure 7

PLEATED CONSTRUCTION FOR EFFECTING GAS TRANSFER MEMBRANE

This application is the National Stage Application of International Patent Application No. PCT/US04/12247 filed Apr. 22, 2004, which claims the benefit of U.S. Provisional Application No. 60/464,523 filed Apr. 22, 2003.

BACKGROUND OF THE INVENTION

This invention relates to a contactor and process to effect gas flow between two fluids including a pleated porous membrane. More particular, this invention relates to such a contactor including a pleated porous membrane and a baffle means for effecting contact of a liquid stream with the pleated membrane.

Microporous membranes are used in a wide variety of applications. Used as separating filters, they remove particles and bacteria from diverse solutions such as buffers and therapeutic containing solutions in the pharmaceutical industry, ultrapure aqueous and organic solvent solutions in microelectronics wafer making processes, and for pre-treatment of water purification processes. In addition, they are used in medical diagnostic devices, where their high porosity results in advantageous absorption and wicking properties.

Hollow fiber membranes are used as membrane contactors, typically for degassing or gas absorption applications. Contactors bring together two phases, i.e., two liquid phases, or a liquid and a gas phase for the purpose of transferring a component from one phase to the other. A common process is gas-liquid mass transfer, such as gas absorption, in which a gas or a component of a gas stream is absorbed in a liquid. Liquid degassing is another example, in which a liquid containing dissolved gas is contacted with an atmosphere, a vacuum or a separate phase to remove the dissolved gas. In an example of conventional gas absorption, gas bubbles are dispersed in an absorbing liquid to increase the gas/liquid surface area and increase the rate of transfer of the species to be absorbed from the gas phase. Conversely, droplets of liquid can be sprayed or the liquid can be transported as a thin film in counter-current operation of spray towers, packed towers, etc. Similarly, droplets of an immiscible liquid can be dispersed in a second liquid to enhance transfer. Packed columns and tray columns have a deficiency as the individual rates of the two phases cannot be independently varied over wide ranges without causing flooding, entrainment, etc. If however, the phases are separated by a membrane, the flow rates of each phase can be varied independently. Furthermore, all the area is available, even at relatively low flow rates. Due to these advantages, hollow fiber membranes are increasingly being used in contactor applications.

Hydrophobic microporous membranes are commonly used for contactor applications with an aqueous solution that does not wet the membrane. The solution flows on one side of the membrane and a gas mixture at a lower pressure than the solution flows on the other. Pressures on each side of the membrane are maintained so that the liquid pressure does not overcome the critical pressure of the membrane, and so that the gas does not bubble into the liquid. Critical pressure, the pressure at which the solution will intrude into the pores, depends directly on the material used to make the membrane, inversely on the pore size of the membrane, and directly on the surface tension of the liquid in contact with the gas phase. Hollow fiber membranes are primarily used because of the ability to obtain a very high packing density with such devices. Packing density relates to the amount of useful filtering surface per volume of the device. Also, they may be operated with the feed contacting the inside or the outside surface, depending on which is more advantageous in the particular application. Typical applications for contacting membrane systems are to remove dissolved gases from liquids, "degassing"; or to add a gaseous substance to a liquid. For example, ozone is added to very pure water to provide a solution for washing semiconductor wafers.

An advantage for contacting applications is that the very low surface tension of hydrophilic membranes such as thermoplastic perfluorinated polymers allows use with low surface tension liquids. For example, highly corrosive developers used in the semiconductor manufacturing industry may contain surface tension reducing additives, such as surfactants. These developers could not be degassed with typical microporous membranes because the liquid would intrude the pores at the pressures used and permeate, causing solution loss and excess evaporation. In addition, liquid filling the pores would greatly add to the mass transfer resistance of gas transport.

Microporous membranes have a continuous porous structure that extends throughout the membrane. Workers in the field consider the range of pore widths to be from approximately 0.05 micron to approximately 10.0 microns. Such membranes can be in the form of sheets, tubes, or hollow fibers. Hollow fibers have the advantages of being able to be incorporated into separating devices at high packing densities. However, hollow fibers have the disadvantages that they are difficult to form and are therefore expensive.

Accordingly, it would be desirable to provide a contactor apparatus which effects gas transfer from one fluid phase to a second fluid phase without the use of hollow fibers. In addition, it would be desirable to provide such a contactor which effects gas transfer between two fluid phases with improved gas transfer efficiency as compared with presently available contactors.

SUMMARY OF THE INVENTION

A contactor is provided comprising an outer housing, a pleated membrane cartridge and one or a plurality of baffles positioned (a) between the inner surface of the housing and the outer surface of the pleated membrane cartridge or (b) within an inner diameter of the pleated membrane cartridge. The baffles effect fluid flow into the interstices between the leaves of the pleated cartridge and in the direction of an outlet for the fluid from the contactor.

BRIEF DESCRIPTION OF THE DRAWINGS

FIG. 4 is a partial side view of a contactor of this invention illustrating flow of one fluid.

FIG. 5 is a top view of a segmented baffle used in the present invention.

FIG. 6 is a partial top view of a baffle having teeth used in the present invention.

FIG. 7 is a top view of a baffle positioned on an inner surface of a membrane cartridge.

DESCRIPTION OF SPECIFIC EMBODIMENTS

In accordance with this invention, a contactor for two fluids is provided wherein gas transfer is effected between the fluids. A first fluid comprising a liquid stream is contacted with an inside surface or an outside surface of a pleated membrane cartridge while a second fluid is contacted with the remaining inside or outside surface of the filter cartridge. One cartridge surface in contact with the first fluid is provided with one or a plurality of baffles which direct fluid flow into the interstices between adjacent leaves of the pleated filter. Fluid flow is maintained within these interstices by a baffle positioned to provide blockage in either (a) the space between the inner surface of a housing for the cartridge and the outer surface of the cartridge or (b) the space inside the inner surface of the cartridge.

One or a plurality of baffles can be utilized along the height of the cartridge. The baffles can be formed of a single piece or from mating segments such as two mating segments. The surface of the baffles can be smooth or one of the baffle surfaces can be provided with teeth that extend into the interstices between the plates or leaves of the cartridge. The inclusion of the teeth provide more intimate contact between the membrane of the cartridge and the first fluid from which gas is removed or into which gas is provided.

The pleated membrane is formed of a membrane layer and a porous support screen layer as is well known in the art. Suitable hydrophobic membranes include those formed of polytetrafluoroethylene-co-perfluoromethylvinylether, (MFA), polytetrafluoroethylene-co-perfluoropropylvinylether, (PFA), polytetrafluoroethylene-co-hexafluoropropylene, (FEP), and polyvinylidene fluoride, (PVDF). Both PFA Teflon® and FEP Teflon® thermoplastics are manufactured by DUPont, Wilmington, Del. Neoflon® PFA is a polymer available from Daikin Industries. MFA Haflon® is a polymer available from Ausimont USA, Inc., Thorofare, NJ. Preformed MFA Haflon® and FEP Teflon® tubes are available from Zeus Industrial Products, Inc., Orangebury S.C. Other thermoplastics or their blends which are useful in the practice of this invention include but are not limited to poly (chlorotrifluoroethylene vinylidene fluoride), polyvinylchloride, polyolefins such a polypropylene, polyethylene, polymethylpentene, ultra high molecularweight polyethylene, ultrahigh molecular weight polyethelene (UPE), polyamides, polysuflones, polyetheretherketones, and polycarbonates.

Figure 1:
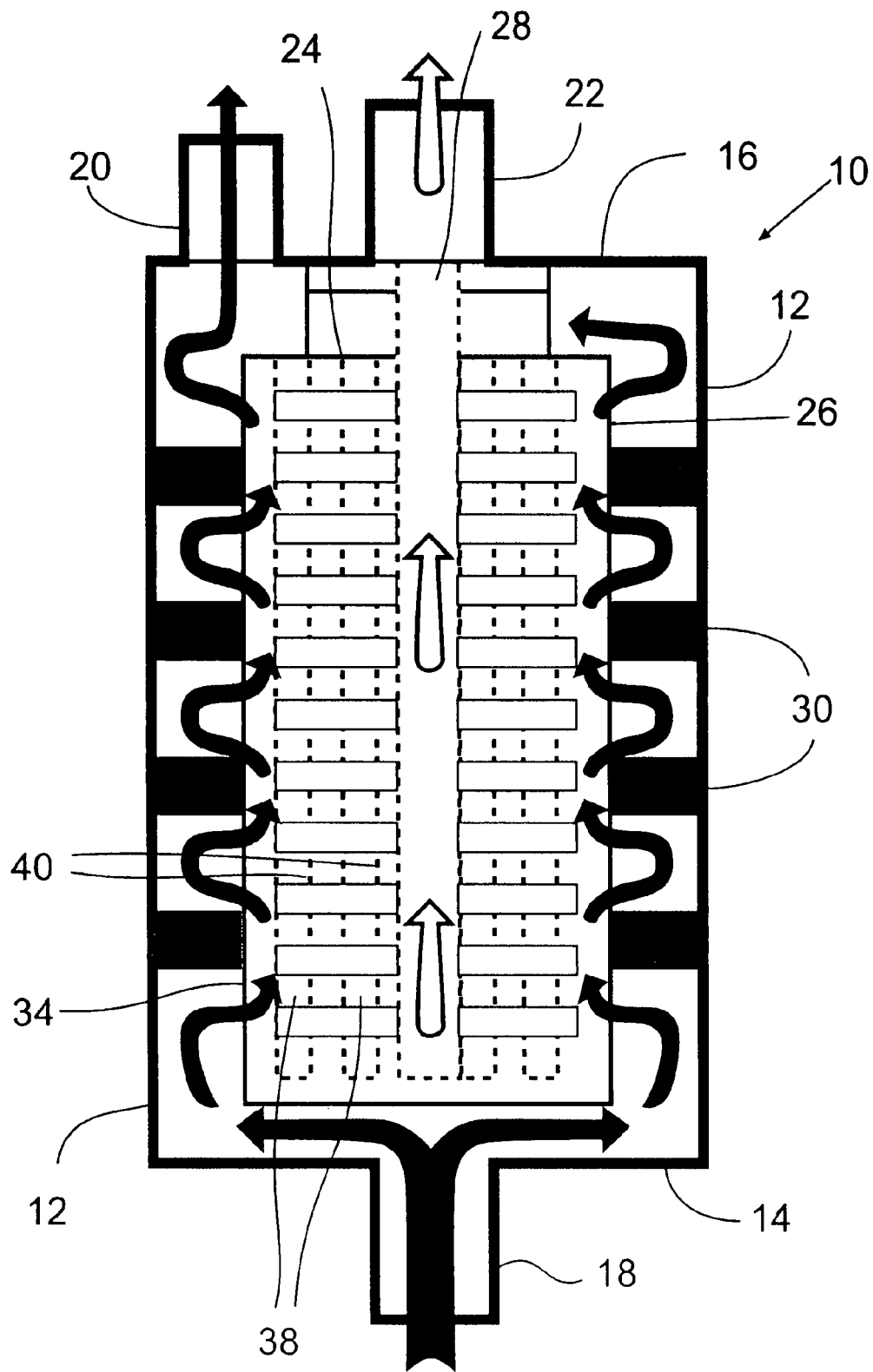
FIG. 1 is a broken side view of a contactor of this invention having baffles positioned on an outside surface of a pleated membrane cartridge.

Referring to FIG. 1, one embodiment of a contactor of this invention 10 is shown, The contactor 10 includes a housing 12 having bonded end caps 14 and 16. End cap 14 includes a liquid inlet 18. End cap 16 includes a liquid outlet 20 and an outlet 22 connected to a vacuum source (not shown). A pleated membrane cartridge 24 surrounded by a porous support cage 26 is provided to support the cartridge 24. A second porous support cage also can be positioned within the central core 28 of the cartridge 24. Baffles 30 extend around the outer circumference of the cartridge 24. The baffles 30 extend from the outer surface 34 of the cage 26 to the inner surfers of the housing 12. The baffles 30 function to direct liquid into the interstices 38 between pleats 40 thereby to provide more intimate contact between the pleated membrane of the pleats 40. In this embodiment, gas bubbles are removed from liquid introduced through inlet 18.

In a second embodiment, a pressurized gas such as ozone can be introduced through opening 22 under conditions to effect transfer of ozone through the pleated membranes into the liquid such as water introduced through inlet 18. If desired a second outlet from the housing (not shown) for the pressurized gas can be provided to remove the pressurized gas from the housing 12.

Figure 2:
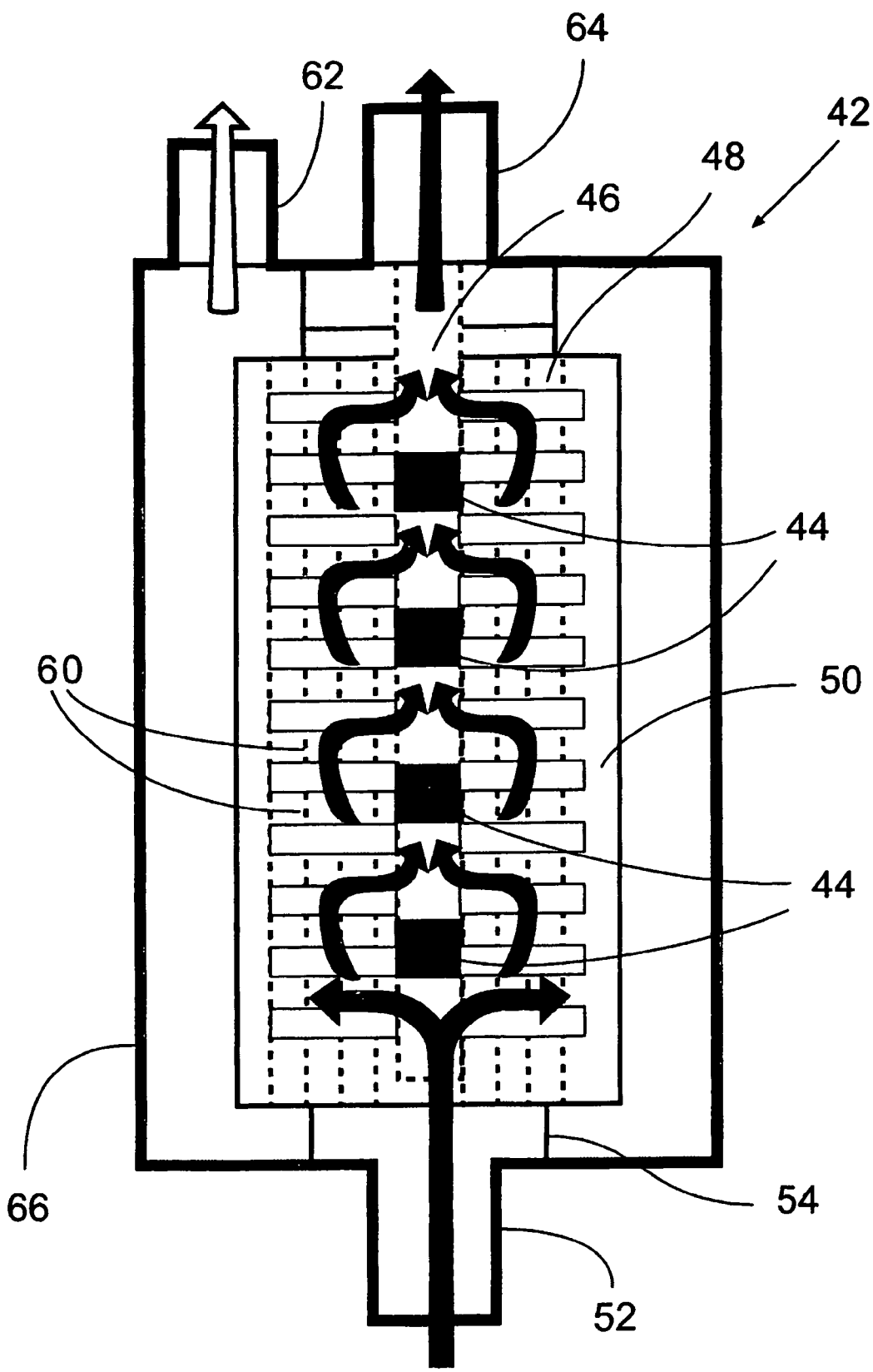
FIG. 2 is a broken side view of a contactor of this invention having baffles positioned on an inside surface of a pleated membrane cartridge.

Referring to FIG. 2, a contactor 42 is provided wherein baffles 44 are positioned within the core 46 of the pleated filter cartridge 48. The cartridge 48 is surrounded by porous support cage 50. Liquid to be degassed is introduced through inlets 52 and 54 into the central core 46 of the cartridge 48. The baffle 44 causes the introduced liquid to move into the interstice between the pleats 60 to effect more intimate contact with the membrane in the pleats 60. A vacuum source (not shown) is connected to outlet 62 to collect gas passing through the pleats 60. Degassed liquid is recovered through outlet 64.

In another embodiment, pressurized gas can be introduced into housing 66 through outlet 62 under conditions to effect gas flow, such as ozone into liquid introduced through inlets 52 and 54.

Figure 3:
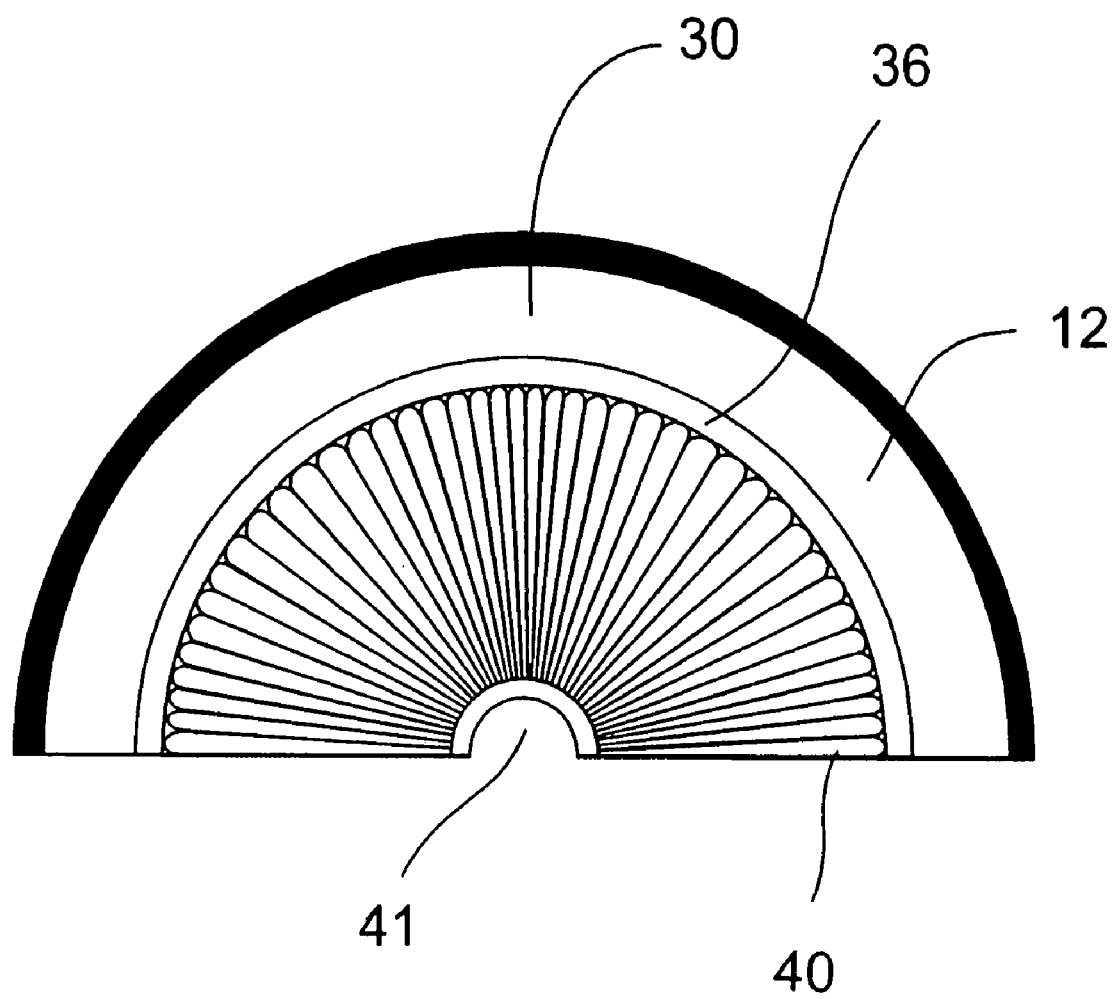
FIG. 3 is a partial top view of a pleated cartridge used in the present invention.

Referring to FIG. 3, the pleats 40 of the cartridge 24 of FIG. 1, are positioned between porous cage 36 and porous cage 41. Cage 36 contacts baffle 30 positioned within housing 12.

Referring to FIG. 4, the baffles 30 cause the liquid to move into the pleats 40 as shown by arrow 65 and 67 to effect more intimate contact between the liquid and the membrane.

Referring to FIG. 5, the baffle 70 is formed from two baffle segments 71 and 72 which contact each other during use.

Referring to FIG. 6, the baffle 73 includes teeth 75 which fit into interstices between adjacent pleats 40 of the cartridge 24 thereby to effect more intimate contact between the liquid and the membrane. When the baffle is positioned within the core of the cartridge as shown in FIG. 3, the teeth are on the outside surfaces of baffles 44.

As shown in FIG. 7, the baffle 44 of FIG. 2 comprises a solid piece.

Figure 8:
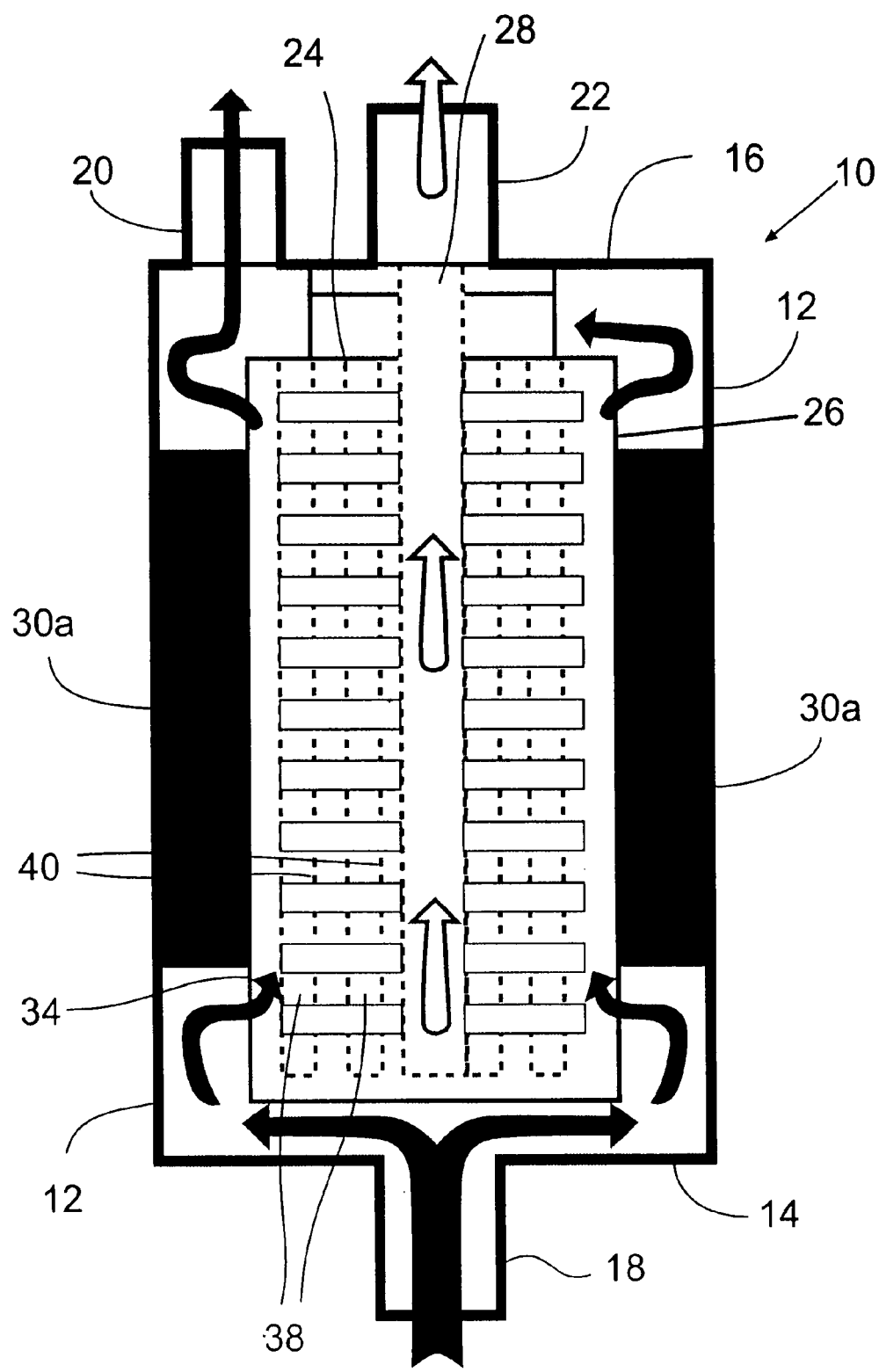
FIG. 8 is a cross sectional view of an alternative contactor of this invention.

Referring to FIG. 8, one embodiment of a contactor 10 of the invention 10 is shown. The contactor 10 includes a housing 12 having bonded end caps 14 and 16. End cap 14 includes a liquid inlet 18. End cap 16 includes a liquid outlet 20 and an outlet 22 connected to a vacuum source (not shown). A pleated membrane cartridge 24 surrounded by a porous support cage 26 is provided to support the cartridge 24. A second porous support cage also can be positioned within the central core 28 of the cartridge 24. Baffles 30a extend around the outer circumference of the cartridge 24. The baffles 30a extend from the outer surface 34 of the cage 26 to the inner surface of the housing 12. The baffles 30a function to direct liquid into the interstices 38 between pleats 40 thereby to provide more intimate contact between the pleated membrane of the pleats 40, In this embodiment, gas bubbles are removed from liquid introduced through inlet 18.

In a second embodiment, a pressurized gas such as ozone can be introduced through opening 22 under conditions to effect transfer of ozone through the pleated membranes into the liquid such as water introduced through inlet 18. If desired a second outlet from the housing (not shown) for the pressurized gas can be provided to remove the pressurized gas from the housing 12.

The following example illustrates the present invention and is not intended to limit the same.

EXAMPLE 1

The apparatus of FIG. 1 having a 0.05 micron hydrophobic ultrahigh molecular weight polyethylene membrane (3500 $cm^2$ area) was tested with deionized water to remove gas from the water. There were no visual signs of any bubble being present at the outlet of the apparatus. The efficiency of degassing, as measured with a YSI 5100 Dissolved Oxygen Meter was 21% and 10% removal at a flow rate of 0.5 liter/min. and 2.0 liter/1 min. respectfully. These results compare with 8.0% with a PFA hollow fiber membrane contactor at a flow rate of 2.0 liter/1 min.

The invention claimed is:

1. A contactor apparatus for effecting passage of gas through a membrane from a first fluid to a second fluid which comprises:
    a cylindrical pleated membrane cartridge positioned within a housing,
    said housing having a first inlet and a first outlet for a first fluid and at least a second outlet for a second fluid,
    and a baffle positioned within a first flow path for said first fluid.

2. The apparatus of claim 1 having a plurality of baffles.

3. The apparatus of claim 1 wherein said baffle is positioned on an outside surface of said cartridge.

4. The apparatus of claim 2 wherein said plurality of baffles is positioned on an outside surface of said cartridge.

5. The apparatus of claim 1 wherein said baffle is positioned on an outside surface of said cartridge.

6. The apparatus of claim 2 wherein said plurality of baffles is positioned on an outside surface of said cartridge.

7. A process for removing gas from a first fluid which comprises
    introducing said first fluid into said first inlet of the apparatus of claim 1 and removing said first fluid from said first outlet and applying a vacuum to said second outlet.

8. The process of claim 7 wherein said second outlet is in fluid communication with a core of said cartridge and said baffles are positioned on an outside surface of said cartridge.

9. The process of claim 7 wherein said second outlet is in fluid communication with an outside surface of said cartridge and said baffles are positioned on an inside surface of said cartridge.

10. A process for introducing a gas to a first fluid which comprises introducing said first fluid into said first inlet of the apparatus of claim 1, removing said first fluid from said first outlet and introducing a pressurized gas into to said second outlet.

11. The process of claim 10 wherein said second outlet is in fluid communication with a core of said cartridge and said baffle is positioned on an outside surface of said cartridge.

12. The process of claim 10 wherein said second outlet is in fluid communication with an outside surface of said cartridge and said baffle is positioned on an inside surface of said cartridge.

13. The process of claim 10 wherein said pressurized gas is ozone.

14. The process of claim 11 wherein said pressurized gas is ozone.

15. The process of claim 12 wherein said pressurized gas is ozone.

16. The apparatus of any one of claims 1, 2, 3, 4, 5 or 6 wherein
    said baffle includes teeth positioned to extend into interstices between pleats of said cartridge.

* * * * *